US008756434B2

(12) United States Patent
Zaks et al.

(10) Patent No.: US 8,756,434 B2
(45) Date of Patent: Jun. 17, 2014

(54) SYSTEM AND METHOD FOR EXECUTING AN ENCRYPTED BINARY FROM A MEMORY POOL (75) Inventors: Ganna Zaks, Mountain View, CA (US); Pierre Betouin, Boulogne (FR); Augustin J. Farrugia, Cupertino, CA (US); Julien Lerouge, Santa Clara, CA (US); Jon McLachlan, San Francisco, CA (US); Gideon M. Myles, San Jose, CA (US); Cédric Tessier, Paris (FR)

(73) Assignee: Apple Inc., Cupertino, CA (US)

( * ) Notice: Subject to any disclaimer, the term of this patent is extended or adjusted under 35 U.S.C. 154(b) by 299 days.

(21) Appl. No.: 13/083,497

(22) Filed: Apr. 8, 2011

(65) Prior Publication Data
US 2012/0260102 A1 Oct. 11, 2012

(51) Int. Cl.
*G06F 12/14* (2006.01)

(52) U.S. Cl.
USPC ............................ 713/189; 713/187; 713/188

(58) Field of Classification Search
USPC .......................................................... 713/189
See application file for complete search history.

(56) References Cited

U.S. PATENT DOCUMENTS

| | | | | |
|---|---|---|---|---|
| 4,550,350 A * | 10/1985 | Billings | | 360/15 |
| 4,999,806 A * | 3/1991 | Chernow et al. | | 717/177 |
| 5,982,887 A * | 11/1999 | Hirotani | | 705/51 |
| 6,567,917 B1 * | 5/2003 | Ziese | | 713/187 |
| 7,039,814 B2 * | 5/2006 | DaCosta | | 713/189 |
| 7,237,123 B2 | 6/2007 | LeVine et al. | | |
| 7,243,193 B2 | 7/2007 | Walmsley | | |
| 7,266,661 B2 | 9/2007 | Walmsley | | |
| 7,333,613 B2 * | 2/2008 | Courcambeck et al. | | 380/262 |
| 7,620,987 B2 | 11/2009 | Shelest et al. | | |
| 7,822,979 B2 * | 10/2010 | Mittal | | 713/164 |
| 8,152,770 B2 * | 4/2012 | Reid | | 604/164.08 |
| 2003/0097596 A1 * | 5/2003 | Muratov et al. | | 713/202 |
| 2006/0031686 A1 | 2/2006 | Atallah et al. | | |
| 2006/0232304 A1 * | 10/2006 | Thorp et al. | | 327/77 |
| 2007/0143630 A1 * | 6/2007 | Zunke | | 713/189 |
| 2011/0060915 A1 * | 3/2011 | Tal | | 713/189 |
| 2012/0054499 A1 * | 3/2012 | Eklund et al. | | 713/189 |

* cited by examiner

*Primary Examiner* — Kambiz Zand
*Assistant Examiner* — Yonas Bayou
(74) *Attorney, Agent, or Firm* — Novak Druce Connolly Bove + Quigg LLP (57) ABSTRACT

Disclosed herein are systems, methods, and non-transitory computer-readable storage media for executing encrypted computer code. A system configured to practice the method receives a request to execute encrypted computer code. In response to the request, the system identifies a portion of the encrypted computer code for execution and decrypts the portion to yield decrypted computer code. Then the system stores the decrypted computer code in a pool of memory and executes the decrypted computer code from the pool of memory. The system can store the decrypted computer code in the pool of memory based on a randomization algorithm so that identical executions of the encrypted computer code result in selections of different available memory locations within the pool of memory. Related portions can be stored non-consecutively in the pool of memory. The pool of memory can store different portions of decrypted computer code over time.

20 Claims, 4 Drawing Sheets

FIG. 1

SYSTEM AND METHOD FOR EXECUTING AN ENCRYPTED BINARY FROM A MEMORY POOL

BACKGROUND

1. Technical Field

The present disclosure relates to encryption and more specifically to executing encrypted binaries in a secure fashion.

2. Introduction

Reverse engineering is used to understand the internal workings of computer programs. Protecting software execution algorithms or processed values are part of the challenges of Digital Rights Management implementations on open operating systems. Executable code of a computer program is, in certain cases, crucial to protect. Given the binary in its original form, malicious parties can statically disassemble, analyze, and patch the binary to their liking by simply overwriting select portions of the binary. Attackers can also steal important data such as cryptographic information or credentials.

Furthermore, after an attacker has produced a modified binary, the attacker can easily share and/or distribute the modified binary for execution on different machines. Existing approaches can slow this process, but can be overcome with specialized tools. In order to strengthen binaries of computer programs against attackers, any improvement in hiding code and ensuring that the code cannot be easily modified, in addition to protection provided by traditional encryption approaches, can provide important security benefits to software publishers as well as to users.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for executing encrypted computer code. A system configured to practice the method receives a request to execute the encrypted computer code. In response to the request, the system identifies a portion of the encrypted computer code for execution and decrypts the portion to yield decrypted computer code. The system stores the decrypted computer code in a pool of memory and executes the decrypted computer code from the pool of memory. The system can store the decrypted computer code in the pool of memory based on a randomization algorithm such that identical executions of the encrypted computer code result in selections of different available memory locations within the pool of memory. The system can also store the decrypted computer code in the pool of memory based on a randomization algorithm such that during a single execution of the encrypted computer code the same segment of decrypted computer code is stored in different memory locations within the pool of memory over time.

Also disclosed is a compiler for compiling encrypted code. The compiler includes a processor and various modules configured to control the processor. A first module is configured to control the processor to receive unencrypted code. A second module is configured to control the processor, as part of a compilation process yielding compiled encrypted code, to divide the unencrypted code into slices and encrypt at least one of the slices. A third module is configured to control the processor to embed an unpacking mechanism, along with the compiled encrypted code, as part of a common executable file, wherein during execution of the common executable file the unpacking mechanism decrypts an encrypted slice on demand to yield a decrypted slice and stores the decrypted slice in a pool of memory for execution. A fourth module is configured to control the processor to provide the compiled encrypted code including the unpacking mechanism.

This disclosure describes yet another embodiment of a non-transitory computer-readable storage medium storing instructions which, when executed by a computing device, cause the computing device to perform the following steps: identifying a portion of the encrypted computer code for execution, decrypting the portion to yield decrypted computer code, temporarily storing the decrypted computer code in a pool of memory designated for decrypted computer code, executing the decrypted computer code from the pool of memory, and evicting the decrypted computer code from the pool of memory when the decrypted computer code is no longer needed.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The present disclosure addresses the need in the art for increasing security and discouraging reverse engineering of protected computer code. The disclosure begins with a brief introductory description of a basic general-purpose system or computing device in FIG. 1, which can be employed to practice the concepts disclosed herein. A more detailed description of the various approaches for creating and executing encrypted computer code will then follow. These variations shall be discussed herein as the various embodiments are set forth. The disclosure now turns to FIG. 1.

Figure 1:
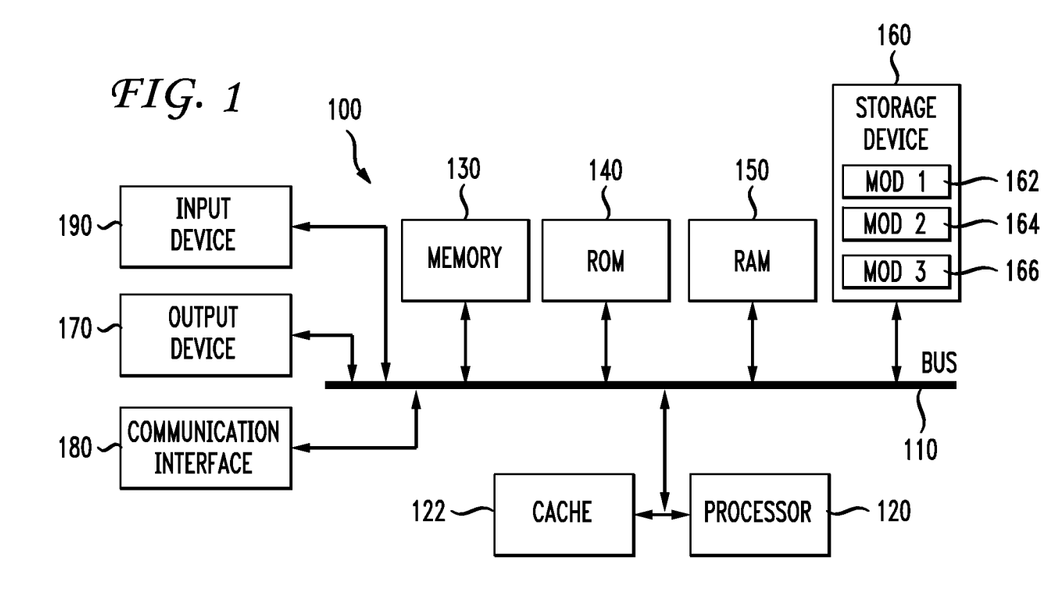
FIG. 1 illustrates an example system embodiment.

With reference to FIG. 1, an exemplary system 100 includes a general-purpose computing device 100, including a processing unit (CPU or processor) 120 and a system bus 110 that couples various system components including the system memory 130, such as read only memory (ROM) 140 and random access memory (RAM) 150, to the processor 120. The system 100 can include a cache 122 of high speed memory connected directly with, in close proximity to, or integrated as part of the processor 120. The system 100 copies data from the memory 130 and/or the storage device 160 to the cache 122 for quick access by the processor 120. In this way, the cache 122 provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a non-transitory computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example, the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited non-transitory computer-readable storage media. Such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored as would be known in the art in other computer-readable memory locations.

Having disclosed some components of a computing system, the disclosure now returns to a discussion of executing protected or packed code. One effective way of hiding the code, or sensitive segments of the code, is to encrypt the code and embed the unpacking mechanism (which can also be distributed in many locations in the code for different slices of the packed code) within the same binary. However, one challenge is discouraging attackers from stealing or reverse engineering the code after the code has been decrypted. The approaches set forth herein allocate a pool of memory and reuse the pool to store segments of the code, such as the text section, which are decrypted at run time, on demand. The encryption approach herein can include the following features: (1) at any time during the program execution, only a small portion of the code is decrypted; (2) the same memory location can be reused to store different code segments; and (3) related code segments can be placed in memory nonconsecutively. The location of decrypted code segments in memory can change from execution to execution and throughout a single execution, further frustrating attackers who would try to hardcode references to the original code.

More specifically, a system implementing these approaches can encrypt the original code and slice it into segments of a given static or variable size. The system can include a special runtime dispatcher module or unpacking mechanism in the binary, which is responsible for decrypting the slices lazily and placing them into the pool of memory. The process of choosing a free pool page can be unpredictable to ensure that the same page can be stored at different memory locations. In addition, the unpacking mechanism is responsible for eviction of unused pages from the pool. The code usually cannot be executed after it has been moved to another location because the code includes relative offsets to the other segments of code around it. Thus, the unpacking mechanism can also patch each segment so the code can execute properly from the new location in the pool.

Figure 2:
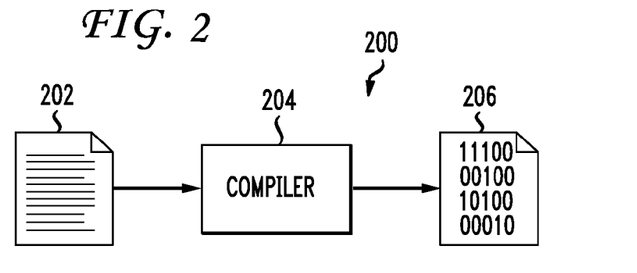
FIG. 2 illustrates an example compiler.
Figure 3:
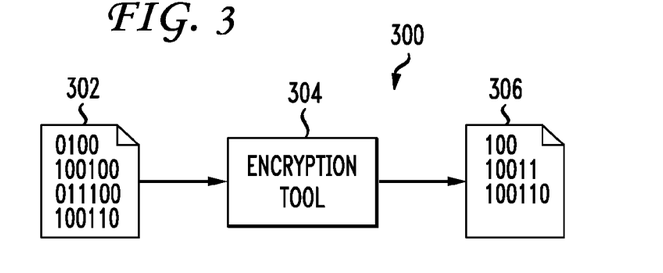
FIG. 3 illustrates an example encryption tool.

The disclosure now turns to FIG. 2, which illustrates an arrangement 200 for generating encrypted code 206. In this arrangement 200, a compiler 204 receives source code 202, such as source code written in C/C++ or Java. The compiler 204 can convert the source code 202 to an intermediate form, such as bytecode (not shown) executable by an interpreter, or can convert the source code 202 to directly executable compiled code 206. FIG. 3 illustrates an example 300 of an encryption tool 304. In this example, the post-processing tool receives compiled code 302 or some intermediate form of code and adds encryption to the compiled code 302 to yield encrypted code 306. The compiler 204 and the encryption tool 304 can be separate modules or can be incorporated into a single module.

Figure 4:
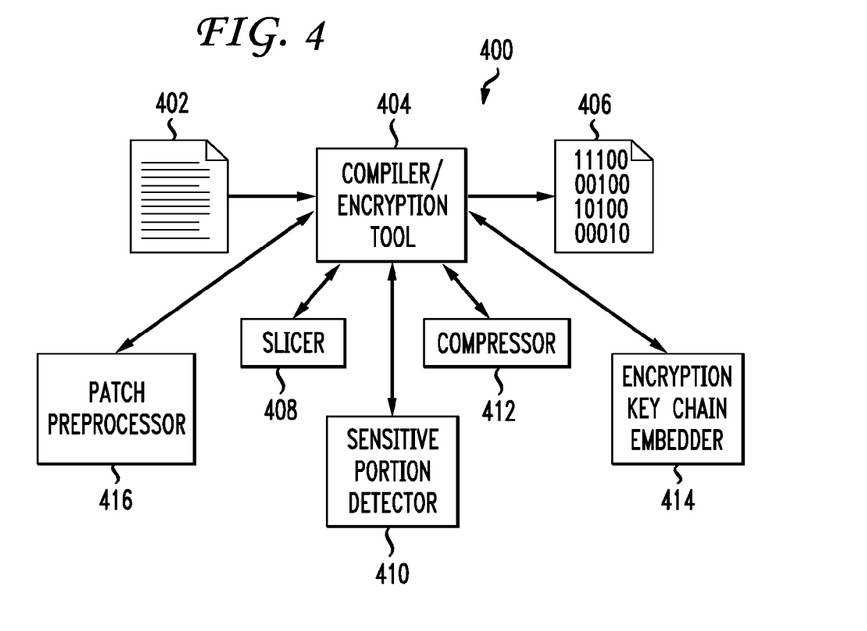
FIG. 4 illustrates an example enhanced compiler.

FIG. 4 illustrates an example 400 of an enhanced compiler and encryption tool 404 or unpacking mechanism. In this example, the tool 404 receives source code 402 and/or previously compiled code. The tool 404 can interact with and/or incorporate various modules that enhance or change how the tool 404 alters the input 402 to provide encrypted code 406 as output. The tool 404 can enhance the encryption process using any combination of the various modules set forth below.

For example, a slicer 408 can perform a static and/or dynamic analysis of the input code 402 to determine appropriate boundaries or sizes for slices in the code. The slicer 408 can slice the input code 402 further based on a target architecture. For example, if the target architecture is a mobile device with a very small on-CPU cache, the slicer 408 can ensure that no single slice is larger than the on-CPU cache so as to avoid a potential cache-miss performance penalty of forcing the CPU to wait while additional information and/or instructions stored in a decrypted slice are fetched to load into the on-CPU cache. The slicing algorithm can be tuned for performance. For example, the slicing algorithm can identify a tight loop, either by a programmatic evaluation of the code or by examining user annotations of the code, and slice the code so that the tight loop is not split across two or more slices. The slicing algorithm can make similar slicing decisions based on other code structures besides loops.

Further, the slicing algorithm can slice the code into fixed size slices or variable size slices. Variable size slices can provide some benefits. First, variable size slices can improve performance. A static/runtime analysis tool can be used to identify code segments, which when split into multiple slices, incur a greater performance overhead or penalty. For example, splitting a code segment into multiple slices could cause one or more instruction cache misses. A slicer algorithm that considers projected performance impacts can produce variable size slices that optimize the desired performance characteristics. Second, variable size slices can provide a security advantage because the variable sizes may confuse an attacker trying to understand how or whether the program has been sliced. In addition, the slices can be used to separate the logical blocks of code for code obfuscation purposes. However, the runtime pool management routines may be more complex when handling slices of variable size. In one variation which adds another level of complexity to thwart attacks, the system can recursively apply the slicing algorithm to individual slices one or more times to perform the same type of obfuscation on one or more individual slice.

A sensitive portion detector 410 can interact with the tool 404 to encrypt only sensitive code. This approach can be used, for example, to enhance security of particularly sensitive portions of the code and/or to increase overall performance. For example, a programmer or some automated tool can annotate the input code 402, such as with a special preprocessor directive, to indicate which portions of code are sensitive or should be protected. For example, a user can tag portions of the code that concern user authentication or confidential business logic as 'sensitive' while other non-sensitive portions of the code, such as the user interface, are either tagged as 'not sensitive' or not tagged at all. When the sensitive portion detector 410 is applied, the tool 404 only applies the approach for executing encrypted binaries from a memory pool to the sensitive portions. This allows the resulting executable code 406 to incur the performance penalty for executing encrypted binaries from a memory pool only for the sensitive portions while the remaining code runs without the performance penalty. The sensitive portion detector 410 can also ensure that the unpacking mechanism is only triggered when the sensitive encrypted code is accessed.

A compressor 412 can compress some or all of the input code 402 before encryption. Compressing the code in this way can provide at least two advantages. First, the resulting executable code 406 occupies fewer bytes, i.e. is smaller. Second, compressed encrypted code provides an additional layer of security. For example, a software developer does not want the attacker to be able to ship or distribute the original but modified binary. Taking into account the attack model, the software developer prefers forcing the attacker to ship another binary altogether. One way an attacker can disable or circumvent the protection is by copying the decrypted and patched slices back to their origin in the encrypted section, essentially rebuilding an unpacked binary in place. Performing compression before encryption can prevent this attack approach because each decrypted, executable slice occupies more bytes then its source encrypted slice. Compressing the code during the build process before encryption solves the two problems. An attacker is unable to simply 'patch' an existing executable by inserting decrypted code back into the executable because the decrypted code is larger than the encrypted code the attacker wishes to replace. This compression enhancement can be optionally applied in conjunction with a non-equal size slice enhancement because the compression ratio depends on the compressed content and the compression algorithm. In one aspect, different compression algorithms or compression algorithm settings can be used to achieve a desired file or slice size, or to achieve particular performance attributes.

An encryption key chain embedder 414 can impose a forced decryption order. An attacker may attempt to retrieve the whole encrypted binary by forcing calls to the runtime unpacking mechanism for every single page of the binary. As a countermeasure to this technique, the encryption key chain embedder 414 can use compile time information to compute a particular order in which code segments should be loaded. The unpacking mechanism can use this information to ensure that the segments are decrypted in the proper order. For example, the unpacking mechanism can derive a chain of keys used for encryption provided by the embedder 414 so that the segments can only be decrypted in a proper order. This enhancement would hinder attackers who try to extract each page of the encrypted binary to retrieve the unencrypted version of the encrypted binary.

As mentioned earlier, the unpacking mechanism can patch, during runtime, the relative offsets in the decrypted code to make the decrypted code executable from the new memory location in the pool. To speed up the unpacking mechanism at runtime, the patch preprocessor 416 can obtain, preprocess, and separately store information about which bytes need patching. The patch preprocessor can store this information at any location in the output binary 406 and/or as a separate companion file. The information about which bytes need patching can be embedded in a single location in the output binary 406 or spread throughout the output binary 406, such as within a same page as the bytes described by the information that need patching.

In addition, the patch preprocessor can scramble the offsets and/or random bytes before encryption of the original code to raise security. For example, if an attacker is able to decrypt the code or steal the code right after the decryption, the attacker would still not be able to execute the code without extra patching.

Figure 5:
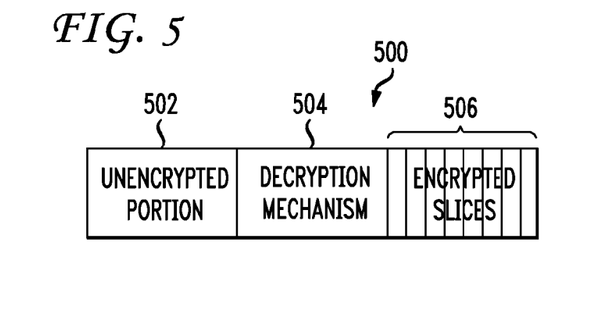
FIG. 5 illustrates an example encrypted binary having an embedded unpacking mechanism.

FIG. 5 illustrates an example encrypted binary 500 having an optional unencrypted portion 502, an embedded unpacking mechanism 504, and a set of slices 506, as an example of the output 206, 306, 406 of the compiler 204, encryption tool 304, or combination compiler/encryption tool 404. The set of slices 506 can include encrypted and/or unencrypted slices. The set of slices 506 can interleave encrypted slices with unencrypted slices. The encrypted slices 506 can be of equal sizes or of non-equal sizes. During execution of the encrypted binary, the embedded unpacking mechanism, otherwise known as a dispatcher, decrypts and loads individual slices into a memory pool for execution. In an extreme case of a binary with a single slice, the entire encrypted binary is in the clear at the same time. However, in more typical use cases where the binary has multiple slices, less than all of the encrypted binary is decrypted (i.e. stored in the clear in the memory pool) at any given time in the execution. As discussed above, even the decrypted copy in the memory pool is not directly useful for an attacker and must be patched or otherwise modified if the attacker wishes to coerce the decrypted copy for his or her own uses.

Figure 6:
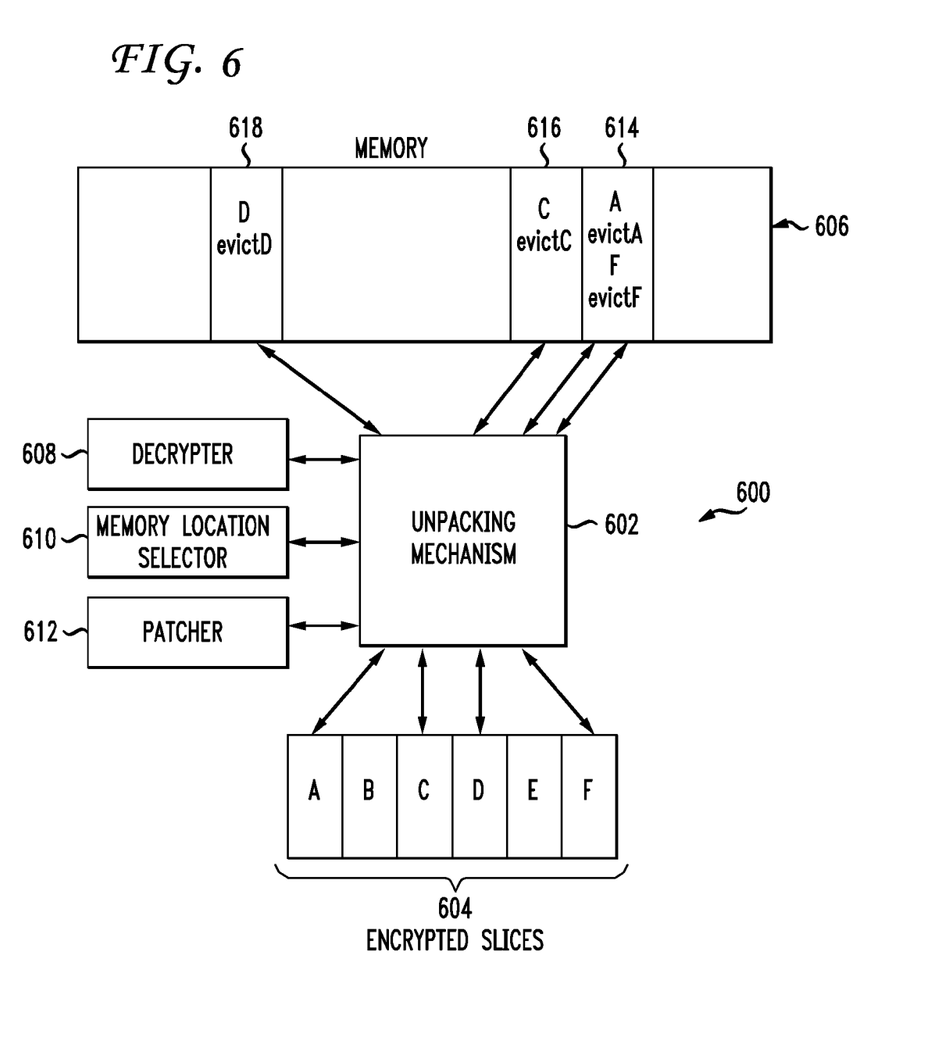
FIG. 6 illustrates an exemplary flow for executing an encrypted binary in a memory pool.

FIG. 6 illustrates an exemplary flow 600 for executing a binary having encrypted slices 604 using a memory pool. As set forth above, the unpacking mechanism or dispatcher 602 and the encrypted slices 604 can be part of the same executable file, but can also be separate files or resources. The unpacking mechanism 602 can incorporate or interact with other modules such as a dedicated decrypter 608, a memory location selector 610 (or pool manager), a patcher 612, and others. The memory location selector 610 or pool manager can select free pages to occupy and evict pages as pages are no longer needed.

At time $T_1$ either before or during the execution of the binary, the unpacking mechanism 602 determines that encrypted slice A is needed for execution. The unpacking mechanism 602 can make this determination by itself, by observing conditions or states of hardware or software external to the unpacking mechanism, and/or based on received input or triggers. The unpacking mechanism 602 can coordinate with the memory location selector 610 to identify a location 614 in memory 606 to designate as the pool. The unpacking mechanism 602 can then optionally place encrypted slice A in that location 614, or can decrypt slice A and store the decrypted slice A directly in location 614. The unpacking mechanism 602 decrypts slice A via the decrypter 608, retrieves information from slice A, patches references in the decrypted result via the patcher 612, and stores the decrypted, patched information corresponding to slice A in memory location 614 for execution. At this time, only slice A is decrypted and executed, and the rest of the slices in the binary remain encrypted. At time $T_2$, after slice A has executed, is no longer needed, and/or after some timeout period expires, the unpacking mechanism 602 evicts A from the location 614 in the memory pool.

Then, at time $T_3$, the unpacking mechanism 602 determines that encrypted slice F is needed for execution. At this time, the unpacking mechanism 602 can simply reuse the same location 614 in memory for slice F instead of using the memory location selector 610 to identify a new location in memory 606 to host slice F. The unpacking mechanism 602 decrypts slice F via the decrypter 608, retrieves information from slice F, patches references in the decrypted result via the patcher 612, and stores the decrypted, patched information corresponding to slice F in memory location 614 for execution. At this time, only slice F is decrypted and executed, and the rest of the slices in the binary remain encrypted.

At time $T_4$, the unpacking mechanism 602 determines that two additional slices are needed, slice C and slice D. Because location 614 is occupied by slice F, the unpacking mechanism 602 can coordinate with the memory location selector 610 to identify two additional locations 616, 618 in memory 606 as new memory pools or as additions to the existing memory pool. The unpacking mechanism 602 decrypts slices C and D via the decrypter 608, retrieves information from slices C and D, patches references in the decrypted results via the patcher 612, and stores the decrypted, patched information corresponding to slices C and D in memory locations 616, 618 for execution. Patching references in slices C and D can include patching references to slice F to point to the memory location 614 storing the decrypted copy of slice F. The system can optionally patch references from slice F at memory location 614 to point to slices C and D at memory locations 616, 618. This optional patching can increase performance because jumping from F to C or D would not trigger the unpacking mechanism.

At this time, only slices F, C, and D are decrypted and executed, and the rest of the slices in the binary remain encrypted. At time $T_5$, after slice D has executed and is no longer needed, the unpacking mechanism 602 evicts D from the location 618 in the memory pool. At time $T_6$, after slice C has executed and is no longer needed, the unpacking mechanism 602 evicts C from the location 616 in the memory pool. At time $T_7$, after slice F has executed and is no longer needed, the unpacking mechanism 602 evicts F from the location 614 in the memory pool.

As set forth in this example, multiple slices can be decrypted and executed simultaneously, but the unpacking mechanism 602 controls which slices are decrypted and executed and only allows those slices which are needed to be decrypted at any given time. This example illustrates that multiple slices can occupy the same physical location in memory at different times, and that the pool can span multiple memory locations at the same time and/or over time. The multiple memory locations can be contiguous or non-contiguous.

The system can base decisions on when to evict pages from the pool of memory on a desired balance of security and performance goals. From a security perspective, the system tries to store the smallest amount of pages in the clear in memory at any given time. However, if the system also takes in to account performance considerations, the system can try to keep the pool populated with the decrypted slices that are expected to be executed in the future. For example, when the system executes a particular encrypted binary, the system executes slices in the following order: 123456556766576576. The sequence 5, 6, 7 and variations thereof are repeatedly executed. The system can notice or otherwise be informed of this pattern, and decide not to evict slices 5, 6, or 7. If all three slices are in memory at the same time, the system incurs little, if any, extra performance penalty after all three slices have been loaded into the pool.

In another variation, the system can perform pre-emptive loading. For instance, the compiler can pre-compute sets of pages which are executed together, and include instructions in the binary for which sets of pages should be kept in memory simultaneously during which portions of the execution for optimal security and/or performance. The compiler can rely on existing algorithms or modifications to existing algorithms for this approach, such as hardware cache eviction algorithms, such as a simple example "least recently used" algorithm.

Figure 7:
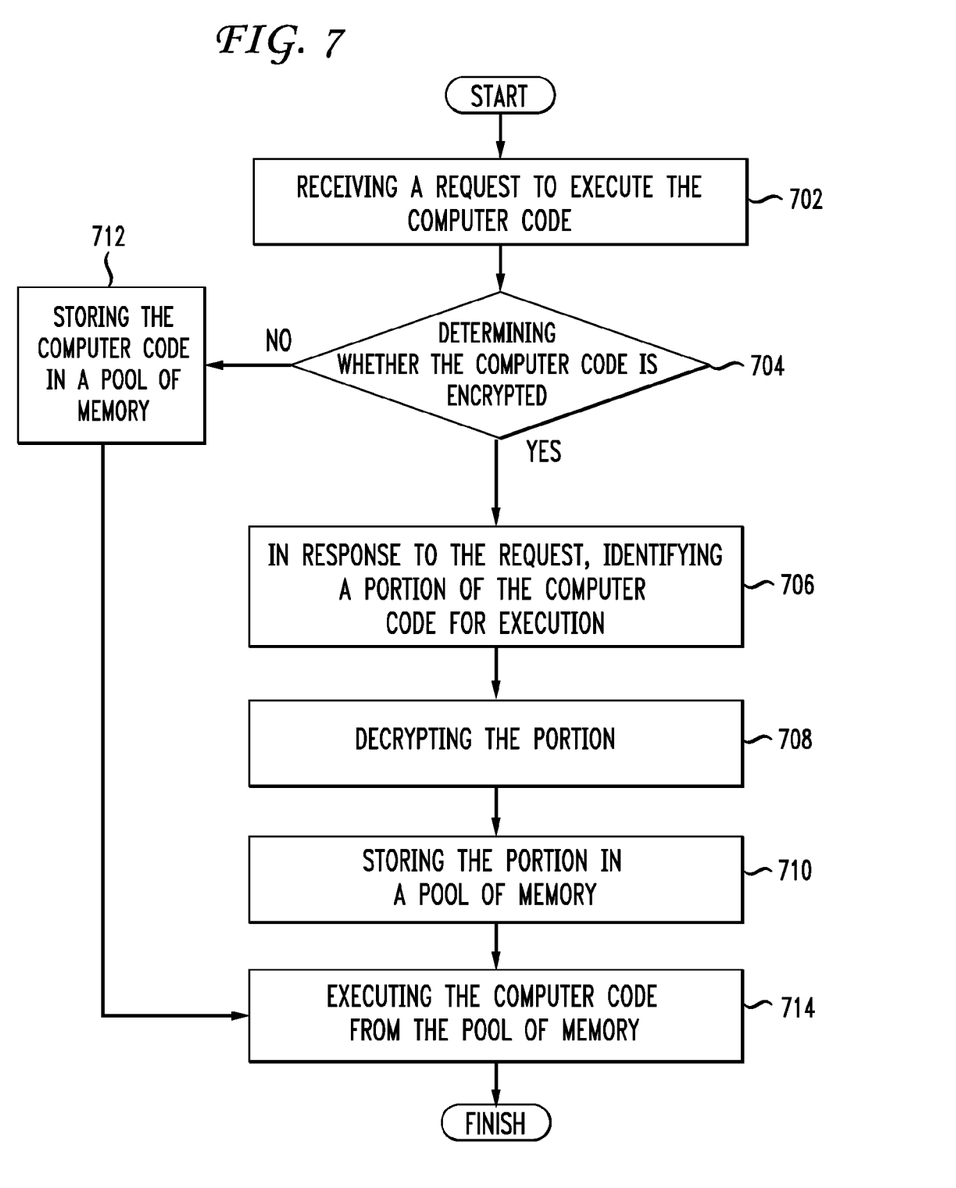
FIG. 7 illustrates an example method embodiment.

Having disclosed some basic system components and concepts, the disclosure now turns to the exemplary method embodiment for executing encrypted computer code shown in FIG. 7. For the sake of clarity, the method is discussed in terms of an exemplary system 100 as shown in FIG. 1 configured to practice the method. The steps outlined herein are exemplary and can be implemented in any combination thereof, including combinations that exclude, add, or modify certain steps.

The system 100 receives a request to execute the computer code (702). The computer code can be part of a software package that includes encrypted and unencrypted code. The system 100 determines whether the computer code is encrypted (704). If the computer code is encrypted, the system identifies a portion of the encrypted computer code for execution in response to the request (706). The system 100 can identify the portion based on one or more of the request, annotations in the code, a table of portions, and so forth.

The system 100 decrypts the portion to yield decrypted computer code (708). The system can decrypt the portion on demand. The system 100 stores the decrypted computer code in a pool of memory (710). The system 100 can store the decrypted computer code in the pool of memory based on a randomization algorithm such that identical executions of the encrypted computer code result in selections of different available memory locations within the pool of memory. Alternatively, the randomization algorithm can lead, during a single execution of the encrypted computer code to storing the same segment of decrypted computer code in different memory locations within the pool of memory over time. The system can store related portions in the pool of memory non-consecutively. The pool of memory can store different portions of decrypted computer code over time.

The system 100 executes the decrypted computer code from the pool of memory (712). If the system determines that the computer code is not encrypted (704), then the system stores the computer code in memory (712) and executes the computer code (714). As noted above, the system typically has a very small fraction of the encrypted code in a decrypted form at any given time, and, in fact, may have no portions of the encrypted code in a decrypted form if none are needed at a given time. The system can decrypt and execute multiple portions of the code simultaneously if needed, but evicts the decrypted portions from the memory pool as they are no longer needed, as other portions are needed, based on an expiration period, and/or based on other information or algorithms. As part of the eviction process, the system can write data over (or otherwise securely wipe data in) the location of the just evicted decrypted portion so that the decrypted data does not remain accessible to an attacker.

Another system embodiment for executing encrypted computer code includes a processor and various modules configured to control the processor. For example, the system can include a first module configured to control the processor to identify a portion of the encrypted computer code for execution in response to a request to execute the encrypted computer code, a second module configured to control the processor to decrypt the portion to yield decrypted computer code, a third module configured to control the processor to store the decrypted computer code in a pool of memory, and a fourth module configured to control the processor executing, via a processor of a computing device, the decrypted computer code from the pool of memory. The portion can be smaller than the encrypted computer code. The encrypted computer code can be sliced into portions, and the first module can select one of the portions. The portion can be part of a set of statically sized or dynamically sized portions. The size for each respective portion can be determined based on an analysis of each respective portion. As set forth above, the encrypted computer code can be compressed before encryption, such that decrypted computer code is larger than the portion of the encrypted computer code.

Also disclosed herein is a compiler. The compiler includes a processor, a first module configured to control the processor to receive unencrypted code, a second module configured to control the processor, as part of a compilation process yielding compiled encrypted code, to divide the unencrypted code into slices and encrypt at least one of the slices, a third module configured to control the processor to embed a unpacking mechanism along with the compiled encrypted code in a common binary, wherein during execution of the common binary the unpacking mechanism decrypts an encrypted slice on demand to yield a decrypted slice and stores the decrypted slice in a pool of memory for execution, and a fourth module configured to control the processor to provide the compiled encrypted code including the unpacking mechanism. The unpacking mechanism can be embodied as a runtime dispatcher or unpacking mechanism configured to decrypt the portion and store the decrypted computer code in the pool of memory during runtime of the compiled encrypted code. The runtime dispatcher can also evict unused portions from the pool of memory.

Another embodiment is a non-transitory computer-readable storage medium storing instructions which, when executed by a computing device, cause the computing device to perform certain steps. The instructions can include identifying a portion of the encrypted computer code for execution, decrypting the portion to yield decrypted computer code, temporarily storing the decrypted computer code in a pool of memory designated for decrypted computer code, executing the decrypted computer code from the pool of memory, and evicting the decrypted computer code from the pool of memory when the decrypted computer code is no longer needed. A runtime unpacking mechanism can decrypt the portion and temporarily store the decrypted computer code in the pool of memory. The runtime unpacking mechanism can further patch a relative offset in the portion to yield a patched relative offset, such that the patched relative offset is properly executable with respect to remaining portions of the encrypted computer code. The runtime unpacking mechanism can patch the relative offset based on preprocessed and separately stored information describing the relative offset. The preprocessed and separately stored information describing the relative offset can be scrambled before encrypting the encrypted computer code and can reside in one or more places within the encrypted computer code and/or as a resource external to the encrypted computer code. The instructions can include computing a loading order of portions of the encrypted computer code based on compile time information, and decrypting the portion and temporarily storing the decrypted computer code in the pool of memory based on the loading order.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein can be combined with any other suitable obfuscation and/or encryption techniques to further discourage attackers and make reverse engineering more difficult. Those skilled in the art will readily recognize various modifications and changes that may be made to the principles described herein without following the example embodiments and applications illustrated and described herein, and without departing from the spirit and scope of the disclosure.

We claim:

1. A method comprising:
receiving a request to execute a computer program, the computer program including a set of encrypted slices and an unpacking mechanism, wherein each encrypted slice in the set of encrypted slices is sized based on an analysis of the computer program, the size based at least in part on at least one of a target architecture, performance, code structure, complexity level, or code sensitivity;
determining that a first encrypted slice from the set of encrypted slices is needed for execution;
decrypting by the unpacking mechanism the first encrypted slice to yield a first decrypted slice;
storing the first decrypted slice at a first location in a pool of memory;
patching relative references based on the first location of the first decrypted slice in the pool of memory;
executing, via a processor of a computing device, the first decrypted slice from the first location in the pool of memory; and
evicting the first decrypted slice from the first location in the memory pool.

2. The method of claim 1, wherein storing the decrypted slice in the pool of memory is based on a randomization algorithm such that identical executions of the computer program result in selections of different available memory locations within the pool of memory.

3. The method of claim 1, wherein decrypting is performed on demand.

4. The method of claim 1, wherein the computer program includes unencrypted code.

5. The method of claim 1, wherein evicting the decrypted slice from the first location in memory comprises overwriting the decrypted slice at the first location with data, thereby making the decrypted slice inaccessible at the first location.

6. The method of claim 1 further comprising:
determining that the first encrypted slice is needed for execution;
decrypting by the unpacking mechanism the first encrypted slice to yield the first decrypted slice;
storing the first decrypted slice at a second location in the pool of memory;
patching relative references based on the second location of the first decrypted slice in the pool of memory;

executing, via the processor of a computing device, the first decrypted slice from the second location in the pool of memory; and evicting the first decrypted slice from the second location in the memory pool.

7. The method of claim 6, wherein storing the decrypted slice at the second location in the pool of memory is based on a randomization algorithm.

8. The method of claim 1 further comprising:

determining that a second encrypted slice from the set of encrypted slices is needed for execution;

decrypting by the unpacking mechanism the second encrypted slice to yield a second decrypted slice;

storing the second decrypted slice at the first location in the pool of memory;

patching relative references based on the first location of the second decrypted slice in the pool of memory;

executing, via the processor of a computing device, the second decrypted slice from the first location in the pool of memory; and evicting the second decrypted slice from the first location in the memory pool.

9. The method of claim 1 further comprising:

prior to evicting the first decrypted slice from the first location in the memory pool, determining that a second encrypted slice from the set of encrypted slices is needed for execution;

decrypting by the unpacking mechanism the second encrypted slice to yield a second decrypted slice;

storing the second decrypted slice at a second location in the pool of memory;

patching relative references based on the second location of the second decrypted slice in the pool of memory;

executing, via the processor of a computing device, the second decrypted slice from the second location in the pool of memory; and evicting the second decrypted slice from the second location in the memory pool.

10. The method of claim 9, wherein the first location and the second location in the pool of memory are non-consecutive.

11. A system comprising:

a processor;

a computer readable storage medium storing instructions for controlling the processor to perform steps comprising:

receiving a request to run executable computer code, the computer code including a set of encrypted slices, wherein each encrypted slice in the set of encrypted slices is sized based on an analysis of the executable computer code, the size based at least in part on at least one of a target architecture, performance, code structure, complexity level, or code sensitivity;

determining that an encrypted slice from the set of encrypted slices is needed for execution;

decrypting the encrypted slice to yield decrypted computer code;

storing the decrypted computer code at a location in a pool of memory;

executing the decrypted computer code from the location in the pool of memory; and evicting the decrypted computer code from the location in the pool of memory.

12. The system of claim 11, wherein the computer code further includes unencrypted computer code.

13. The system of claim 11, wherein the computer code is compressed before encryption, such that decrypted computer code is larger than the encrypted slice.

14. A non-transitory computer-readable storage medium storing instructions which, when executed by a computing device, cause the computing device to perform steps comprising:

identifying an encrypted slice of encrypted computer code for execution, wherein a size of the encrypted slice is based on an analysis of the computer code, the size based at least in part on at least one of a target architecture, performance, code structure, complexity level, or code sensitivity;

decrypting the encrypted slice to yield decrypted computer code;

temporarily storing the decrypted computer code at a location in a pool of memory designated for decrypted computer code;

executing the decrypted computer code from the location in the pool of memory; and evicting the decrypted computer code from the pool of memory when the decrypted computer code is no longer needed.

15. The non-transitory computer-readable storage medium of claim 14, wherein a runtime dispatcher decrypts the encrypted slice and temporarily stores the decrypted computer code at the location in the pool of memory.

16. The non-transitory computer-readable storage medium of claim 15, wherein the runtime dispatcher further patches a relative offset to yield a patched relative offset, such that the patched relative offset is properly executable.

17. The non-transitory computer-readable storage medium of claim 16, wherein the runtime dispatcher patches the relative offset based on preprocessed and separately stored information describing the relative offset.

18. The non-transitory computer-readable storage medium of claim 17, wherein the information describing the relative offset is scrambled before encrypting the encrypted computer code.

19. The non-transitory computer-readable storage medium of claim 15, further comprising computing a loading order of slices of the encrypted computer code based on compile time information.

20. The non-transitory computer-readable storage medium of claim 19, wherein the runtime dispatcher decrypts the encrypted slice and temporarily stores the decrypted computer code in the pool of memory based on the loading order.

* * * * *